US009488836B2

(12) United States Patent
Bohn et al.

(10) Patent No.: US 9,488,836 B2
(45) Date of Patent: Nov. 8, 2016

(54) SPHERICAL INTERFACE FOR BINOCULAR DISPLAY

(71) Applicant: MICROSOFT TECHNOLOGY LICENSING, LLC, Redmond, WA (US)

(72) Inventors: David D. Bohn, Fort Collins, CO (US); Steve Robbins, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 13/886,161

(22) Filed: May 2, 2013

(65) Prior Publication Data

US 2014/0327970 A1   Nov. 6, 2014

(51) Int. Cl.
| G02B 27/14 | (2006.01) |
| G02B 27/01 | (2006.01) |
| G02B 6/10 | (2006.01) |
| G02B 6/34 | (2006.01) |

(52) U.S. Cl.
CPC ............ *G02B 27/0172* (2013.01); *G02B 6/10* (2013.01); *G02B 6/34* (2013.01); *G02B 27/0179* (2013.01); *G02B 2027/0154* (2013.01); *G02B 2027/0178* (2013.01)

(58) Field of Classification Search
CPC ............ G02B 2027/0154; G02B 2027/0178; G02B 27/0172; G02B 27/0179; G02B 6/00; G02B 6/10; G02B 6/34
USPC .......... 359/630–633; 385/15, 31, 37, 39, 47, 385/133, 146, 147
See application file for complete search history.

(56) References Cited

U.S. PATENT DOCUMENTS

| 4,711,512 | A | 12/1987 | Upatnieks |
| 4,740,836 | A * | 4/1988 | Craig ............................. 348/49 |
| 5,856,842 | A | 1/1999 | Tedesco |
| 6,204,974 | B1 * | 3/2001 | Spitzer ................ G02B 27/017 359/630 |
| 6,323,970 | B1 | 11/2001 | Popovich |
| 6,580,529 | B1 | 6/2003 | Amitai et al. |
| 7,184,615 | B2 | 2/2007 | Levola |
| 7,576,916 | B2 | 8/2009 | Amitai |
| 8,160,411 | B2 | 4/2012 | Levola et al. |
| 8,189,263 | B1 | 5/2012 | Wang et al. |
| 8,233,204 | B1 | 7/2012 | Robbins et al. |
| 8,611,014 | B2 | 12/2013 | Valera et al. |
| 8,817,350 | B1 | 8/2014 | Robbins et al. |

(Continued)

FOREIGN PATENT DOCUMENTS

WO   2012172295 A1   12/2012

OTHER PUBLICATIONS

ISA European Patent Office, International Search Report & Written Opinion for PCT/US2014/036469, WIPO, Aug. 5, 2014, 10 Pages.

(Continued)

*Primary Examiner* — Scott J Sugarman
*Assistant Examiner* — Vipin Patel
(74) *Attorney, Agent, or Firm* — Micah Goldsmith; Judy Yee; Micky Minhas (57) ABSTRACT

A binocular display includes a waveguide. A convex spherical mount has a fixed position relative to the waveguide. A light engine includes a concave spherical mount that adjustably mates with the convex spherical mount.

13 Claims, 7 Drawing Sheets

(56) References Cited

U.S. PATENT DOCUMENTS

| | | | |
|---|---|---|---|
| 2003/0095755 A1* | 5/2003 | Vaganov | G02B 6/4225 385/88 |
| 2007/0041684 A1 | 2/2007 | Popovich et al. | |
| 2010/0245757 A1 | 9/2010 | Sugihara et al. | |
| 2011/0007277 A1 | 1/2011 | Solomon | |
| 2012/0069448 A1* | 3/2012 | Sugihara et al. | 359/643 |
| 2012/0206452 A1 | 8/2012 | Geisner et al. | |
| 2012/0218301 A1 | 8/2012 | Miller | |
| 2012/0249797 A1 | 10/2012 | Haddick et al. | |
| 2012/0280893 A1 | 11/2012 | Holakovszky | |
| 2012/0299923 A1 | 11/2012 | Takahashi | |
| 2013/0033756 A1 | 2/2013 | Spitzer et al. | |
| 2013/0051730 A1 | 2/2013 | Travers et al. | |
| 2013/0083396 A1 | 4/2013 | Pretorius et al. | |
| 2014/0104665 A1 | 4/2014 | Popovich et al. | |
| 2014/0140653 A1 | 5/2014 | Brown et al. | |
| 2014/0140654 A1 | 5/2014 | Brown et al. | |
| 2014/0204455 A1 | 7/2014 | Popovich et al. | |

OTHER PUBLICATIONS

Rolland, et al., "Head-Mounted Display Systems", Retrieved at <<http://3dvis.optics.arizona.edu/publications/pdf/EOE_HMDsystem_Rolland_Hua_05.pdf>>, In Encyclopedia of Optical Engineering, Retrieved Date: Feb. 2, 2013, pp. 14.

IPEA European Patent Office, Written Opinion of the IPEA Issued in International Application No. PCT/US2014/036469, Mar. 31, 2015, WIPO, 6 pages.

Minier, V. et al., "Diffraction Characteristics of Superimposed Holographic Gratings in Planar Optical Waveguides," IEEE Photonics Technology Letters, vol. 4, No. 10, Oct. 1992, 4 pages.

Pu, A. et al., "Exposure Schedule for Multiplexing Holograms in Photopolymer Films," Optical Engineering, vol. 35, No. 10, Oct. 1996, 6 pages.

Han, X. et al., "Accurate Diffraction Efficiency Control for Multiplexed Volume Holographic Gratings," Optical Engineering, vol. 41, No. 11, Available Online Oct. 2002, 13 pages.

Yan, A. et al., "Multiplexing Holograms in the Photopolymer with Equal Diffraction Efficiency," Advances in Optical Data Storage Technology, SPIE vol. 5643, Nov. 2004, 9 pages.

Massenot, S. et al., "Multiplexed Holographic Transmission Gratings Recorded in Holographic Polymer-Dispersed Liquid Crystals: Static and Dynamic Studies," Applied Optics, vol. 44, No. 25, Sep. 2005, 8 pages.

Zharkova, G. et al., "Study of the Dynamics of Transmission Gratings Growth on Holographic Polymer-Dispersed Liquid Crystals," International Conference on Methods of Aerophysical Research, ICMAR 2008, Jun. 2008, 4 pages.

Kress, B. et al., "Exit Pupil Expander for Wearable See-Through Displays," Photonic Applications for Aerospace, Transportation, and Harsh Environment IIII, SPIE vol. 8368, Apr. 2012, 8 pages.

IPEA European Patent Office, International Preliminary Report on Patentability Issued in Application No. PCT/US2014/036469, Jul. 7, 2015, WIPO, 7 Pages.

* cited by examiner

SPHERICAL INTERFACE FOR BINOCULAR DISPLAY

BACKGROUND

Computer animation allows a user to view computer simulated objects and environments on a display, such as a television or computer monitor. To increase a user's feeling of immersion into a computer generated environment, a user may view the computer generated environment through a virtual reality display. Such a virtual reality display may effectively block the user's perception of the real world so that the user feels completely immersed in the computer generated environment. To provide a feeling of complete immersion, while maintaining connection to the real world, an augmented reality display may incorporate augmented reality images into a user's actual view of the real world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A binocular display includes a waveguide. A convex spherical mount has a fixed position relative to the waveguide. A light engine includes a concave spherical mount that adjustably mates with the convex spherical mount.

DETAILED DESCRIPTION

Augmented reality head mounted displays may be used to present complementary binocular images that originate from separate light sources. The binocular images should be precisely aligned on the display (i.e., precise horizontal, vertical, and rotational alignment) to facilitate perception of a single unified image by the left and right eyes of the user. If the images are not precisely aligned, the user will perceive a double image which can be disorienting. This disclosure is directed to the precise alignment of binocular images.

Figure 1:
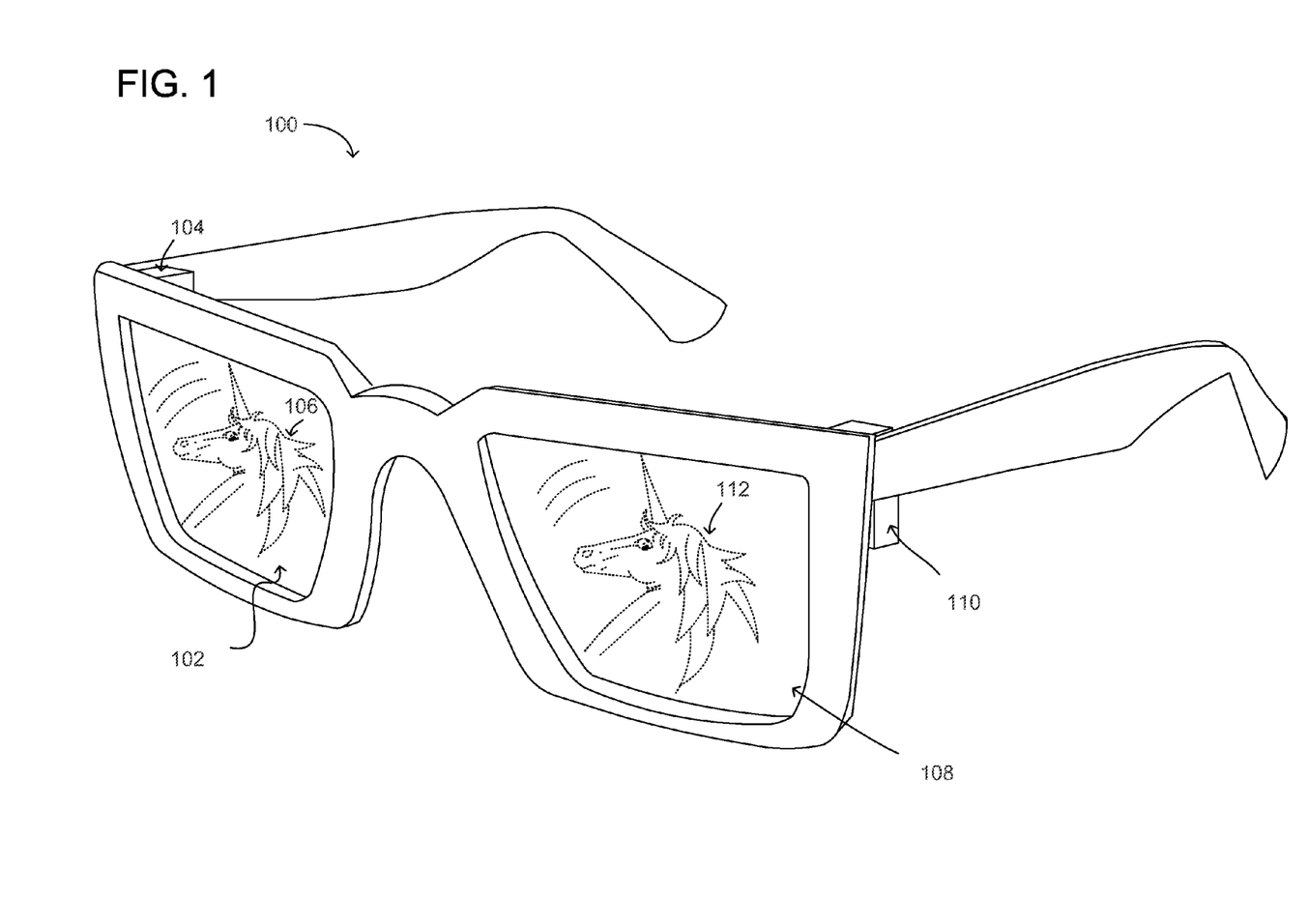
FIG. 1 shows an example binocular head mounted display.

FIG. 1 shows an example binocular head mounted display 100 used to display augmented reality images to a user. The binocular head mounted display 100 includes a first waveguide 102 and a first light engine 104. The first light engine 104 is used to project light into the first waveguide where the light undergoes total internal reflection (TIR) before the light is output from the first waveguide 102 as a first viewable image 106.

Binocular head mounted display 100 also includes a second waveguide 108 and a second light engine 110. The second light engine is used to project light into the second waveguide 108 where the light undergoes TIR before exiting the second waveguide 108 as a second viewable image 112 that is complementary to the first viewable image 106.

The first viewable image 106 and the second viewable image 112 may augment the real world scene that is visible to the user through the waveguides. For example, a user may be looking at an empty room through the waveguides, but may perceive an augmented reality in which a unicorn appears to be in the room. Viewable images may appear to be at least partially transparent or fully opaque. For example, an opaque image can be used to effectively block a user's view of real world objects in a scene. Precise alignment of complementary images presented to the right and left eyes facilitates perception of a single unified image by the user.

Angles of the projected light from the light engine as the light enters the waveguide (i.e., the horizontal, vertical, and/or rotational angle of projected light) can affect relative alignment of complementary images. As such, precise alignment of complementary images in the binocular head mounted display may be dependent on three separate alignment angles of light entering the waveguide.

Figure 2:
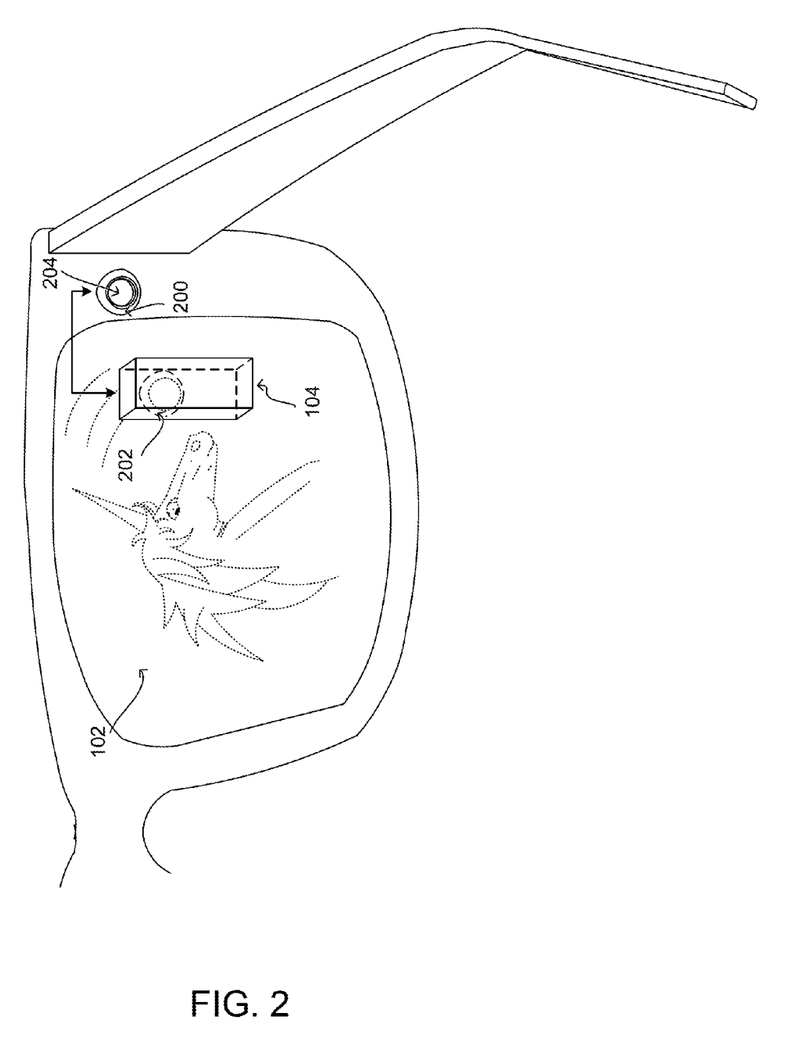
FIG. 2 shows a spherical interface for adjustably mounting a light engine of the binocular head mounted display of FIG. 1 to a waveguide of the binocular head mounted display of FIG. 1.

FIG. 2 shows an example interface used to facilitate alignment between images in a binocular head mounted display. The interface includes a convex spherical mount 200 having a fixed position relative to a waveguide, such as first waveguide 102, and a concave spherical mount 202 having a fixed position relative to a light engine, such as first light engine 104. The convex spherical mount 200 may adjustably mate with concave spherical mount 202 to facilitate precise alignment of the light engine relative to the waveguide in three dimensions. Further, the entrance angle of projected light from the light engine may be selectively controlled by setting the light engine relative to the waveguide using this spherical interface. Although illustrated and described in the context of a right eye, this type of interface may be used for the right and/or left eye.

Figure 3A:
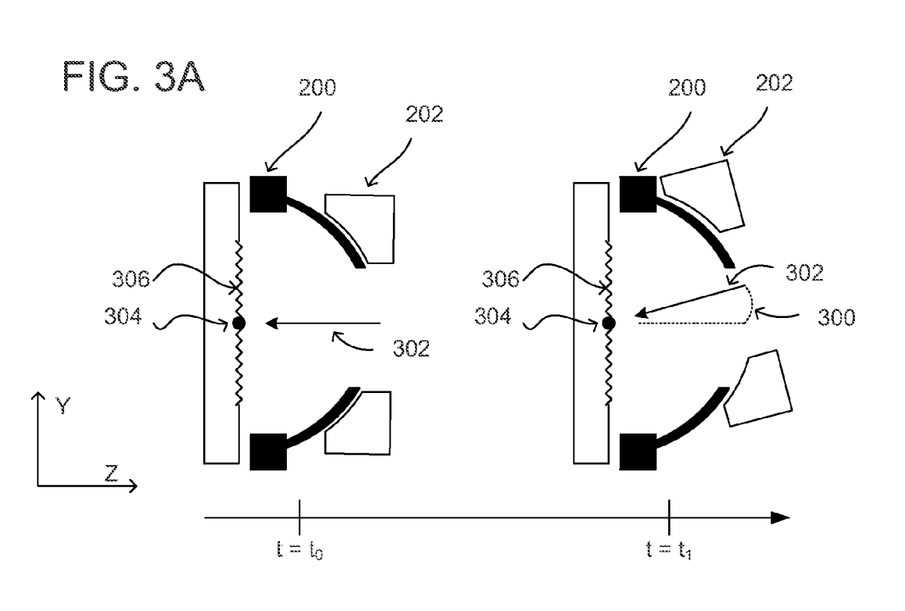
FIGS. 3A and 3B show the spherical interface of FIG. 2 being used to change the vertical entrance angle of light projected into the waveguide.
Figure 3B:
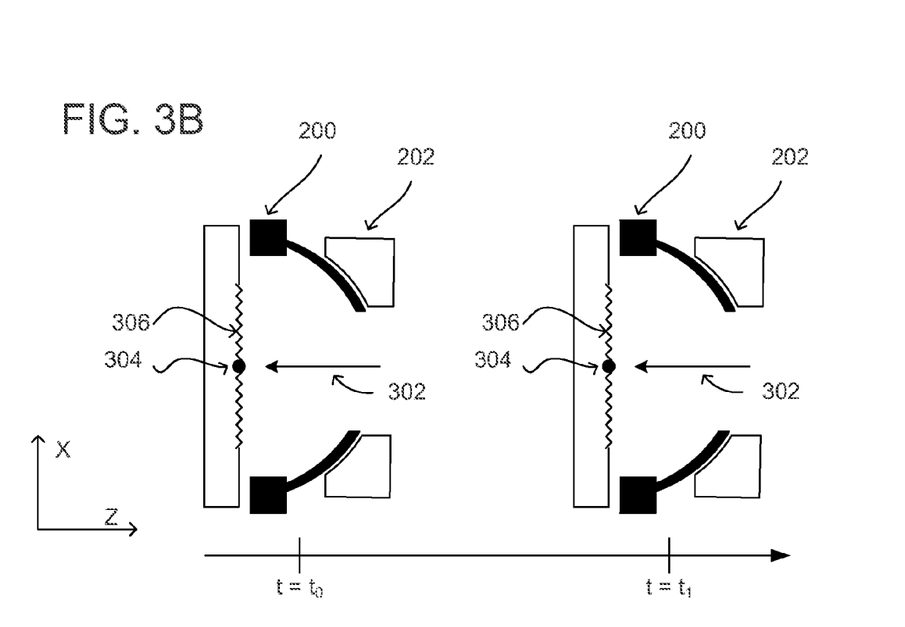

FIG. 3A is a vertical cross section showing the concave spherical mount 202 adjustably mating with the convex spherical mount 200 to change a vertical entrance angle 300 of light 302 projected into the waveguide. The vertical entrance angle may be adjusted to change the position of a viewable image on the waveguide. FIG. 3B is a horizontal cross section showing the concave spherical mount 202 and the convex spherical mount 200 remaining in the same relative horizontal alignment as the vertical alignment is changing from time $t_0$ to time $t_1$.

Figure 4A:
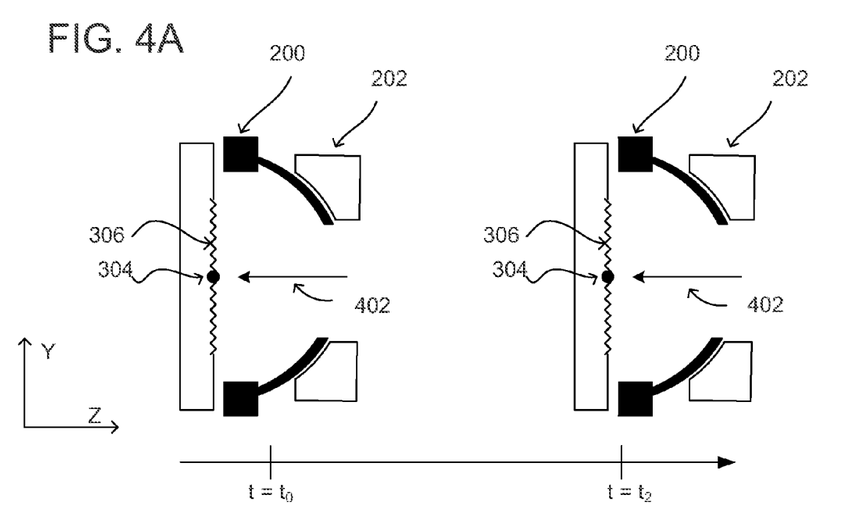
FIGS. 4A and 4B show the spherical interface of FIG. 2 being used to change the horizontal entrance angle of light projected into the waveguide.
Figure 4B:
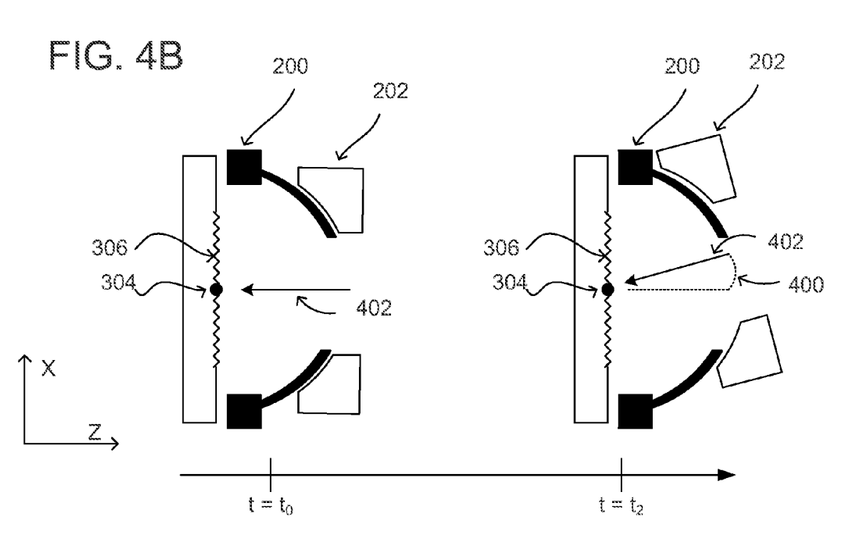

Similarly, FIG. 4B is a horizontal cross section showing the concave spherical mount 202 adjustably mating with the convex spherical mount 200 to change a horizontal entrance angle 400 of light 402 projected into the waveguide. The horizontal entrance angle may be adjusted to change the position of a viewable image on the waveguide. FIG. 4A is a vertical cross section showing the concave spherical mount 202 and the convex spherical mount 200 remaining in the same relative vertical alignment as the horizontal alignment is changing from time $t_0$ to time $t_2$.

Figure 5:
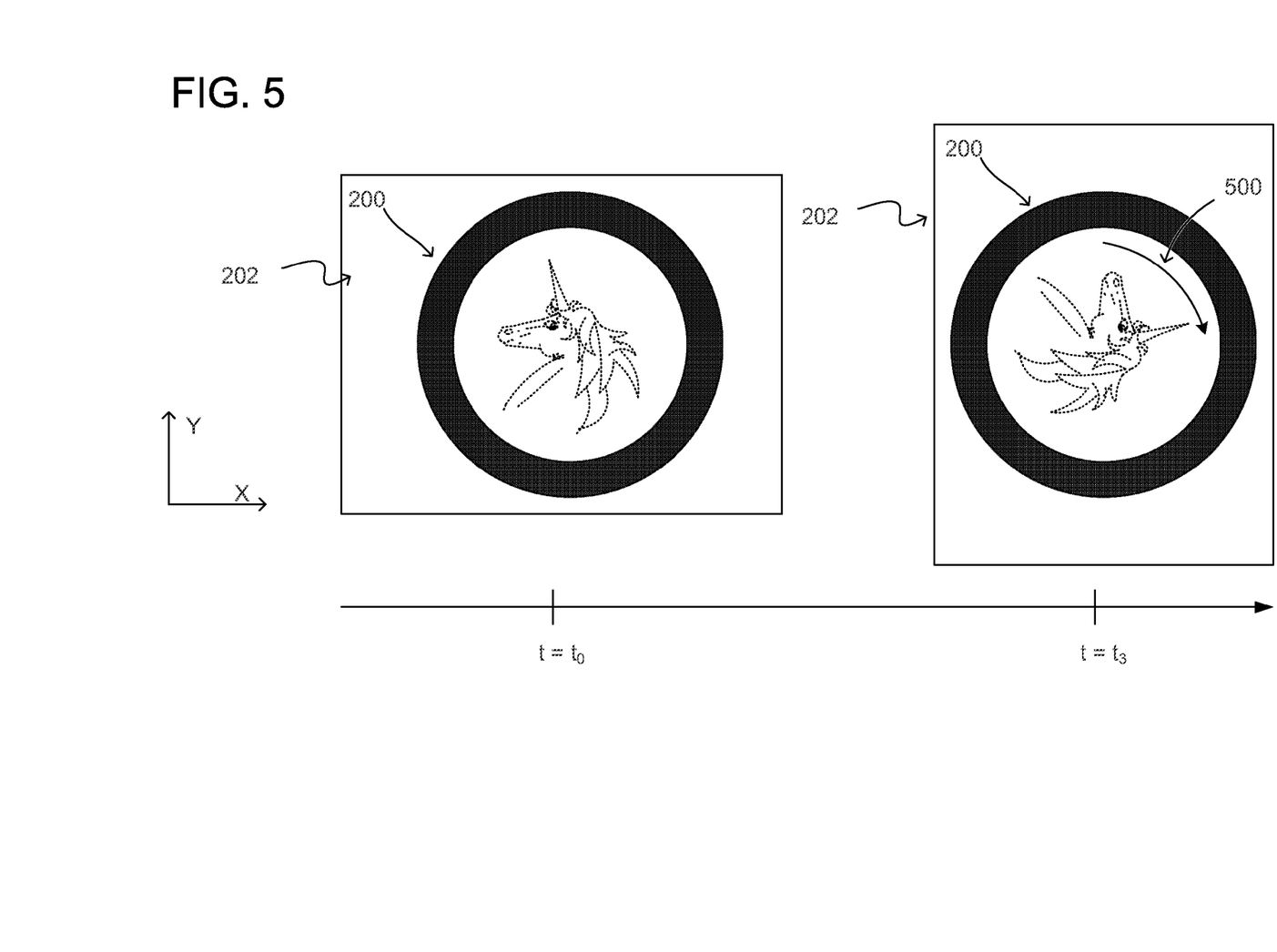
FIG. 5 shows the spherical interface of FIG. 2 being used to change the rotation angle of light projected into the waveguide.

Similarly, FIG. 5 is a cross section in a plane perpendicular to the optical axis of the waveguide showing the concave spherical mount 202 adjustably mating with the convex spherical mount 200 to change a rotation angle 500 of light projected into the waveguide from time $t_0$ to time $t_3$. The rotation angle may be adjusted to change the orientation of a viewable image on the waveguide.

While the vertical, horizontal, and rotational entrance angles may be adjusted independently of one another, as shown in FIGS. 3A, 3B, 4A, 4B, and 5, two or three dimensions may be changed at the same time.

As shown in FIGS. 3A, 3B, 4A, and 4B, an exit pupil 304 of the light engine is located at a center of curvature of convex spherical mount 200 and a center of curvature of concave spherical mount 202 when the convex spherical mount 200 is mated to the concave spherical mount 202. Because the exit pupil is located at the center of curvature, the position of the exit pupil does not change when the horizontal, vertical, and/or rotational entrance angles change. Although not required, the exit pupil 304 is a projected exit pupil which is external to the light engine in the illustrated examples.

Collimated projected light at exit pupil 304 enters the waveguide via an entrance grating 306 before undergoing TIR and leaving the waveguide as a viewable image. Entrance grating 306 is also located at a center of curvature of convex spherical mount 200 and a center of curvature of concave spherical mount 202 when the convex spherical mount 200 is mated to the concave spherical mount 202. As such, the position of the exit pupil 304 coincides with the position of the entrance grating 306.

The contact region between mated convex spherical mount 200 and concave spherical mount 202 allows the mounts to horizontally, vertically, and/or rotationally move relative to each other. The outer radius of curvature of the convex spherical mount 200 may substantially match the inner radius of curvature of the concave spherical mount. The contact region(s) between the mounts may include an uninterrupted contact surface, as shown. The contact region(s) additionally or alternatively may include one or more point contacts located on the concave spherical mount and/or on the concave spherical mount.

The spherical mount may be variously positioned without departing from the scope of this disclosure. As one example, FIG. 2 shows the spherical mount positioned on a face of the waveguide. Here, the convex spherical mount defines a window 204 through which light from the light engine travels into the waveguide. In this configuration, horizontal adjustment changes the horizontal entrance angle of light, vertical adjustment changes the vertical entrance angle of light, and rotational adjustment changes the rotation angle of light. It is to be understood that a frame or other structure may be located between the spherical interface and the waveguide.

Figure 6:
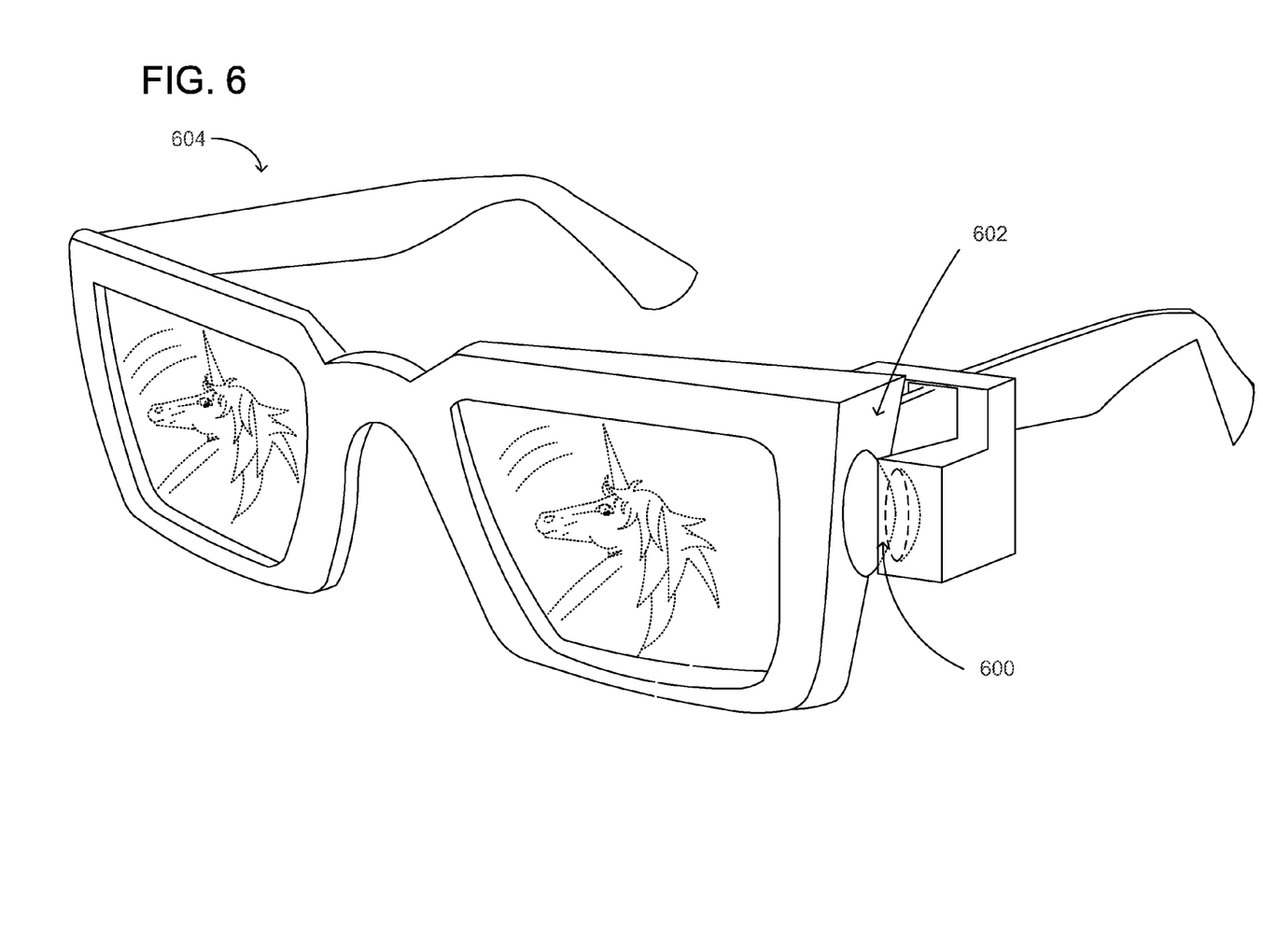
FIG. 6 shows an example binocular head mounted display with a spherical interface on a side of a waveguide.

As another example, FIG. 6 shows a spherical mount 600 positioned on a side 602 of the waveguide. As with the previously discussed face-mounted option, a binocular head mounted display 604 may be configured such that a projected exit pupil of the light engine and an entrance grating of the waveguide are located at a center of curvature of the spherical mount 600. In this configuration, horizontal adjustment changes the horizontal entrance angle of light, vertical adjustment changes the rotation angle of light, and rotational adjustment changes the vertical entrance angle of light. The spherical mount may have alternative placements without departing from the scope of this disclosure.

The size and shape of the spherical mounts may be selected to provide a desired level of adjustability. In general the adjustability may be +/−2 degrees in each direction. However, as a non-limiting example, in some cases the spherical mounts may provide for 3-6 arc minutes of adjustment to the vertical entrance angle, 5-10 arc minutes of adjustment to the horizontal entrance angle, and 5-10 arc minutes of adjustment to the rotation angle. After adjustment, the position of the concave spherical mount relative to the convex spherical mount may be permanently or temporarily set in any suitable manner (e.g., epoxy, set screw, etc.). Furthermore, the above described physical adjustments may be complemented by electronic adjustments that shift projected light in a spatial light modulator. Physical and/or electronic adjustments may be performed in a manufacturing facility and/or by an end user.

Figure 7:
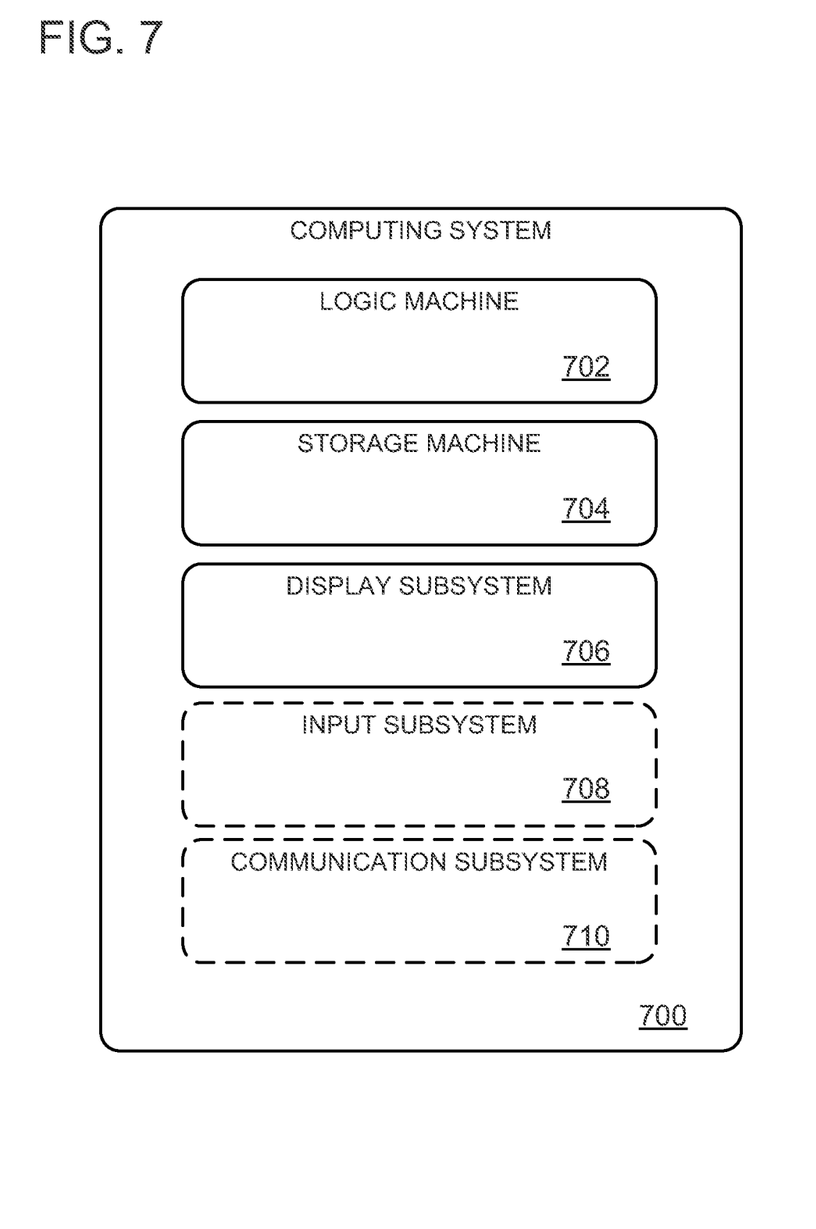
FIG. 7 shows an example computing system for use with a binocular head mounted display.

FIG. 7 schematically shows a non-limiting embodiment of a computing system 700 of binocular head mounted display 100 of FIG. 1. Computing system 700 may be integrated into binocular head mounted display 100 or implemented as a peripheral controller physically separate from the binocular head mounted display 100.

Computing system 700 includes a logic machine 702, a storage machine 704, and a display subsystem 706 for driving one or more light engines, such as first light engine 104 and/or second light engine 110 of FIG. 1. Computing system 700 may optionally include an input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 706 may be used to present a visual representation of data held by storage machine 704 via first light engine 104 and second light engine 110 of FIG. 1. This visual representation may take the form of augmented reality images, as described above. As the herein described methods and processes change the data held by the storage machine, and thus transform the state of the storage machine, the state of display subsystem 706 may likewise be transformed and cause the light engines to visually represent changes in the underlying data.

When included, input subsystem 708 may comprise or interface with one or more user-input devices. In some embodiments, the input subsystem may comprise or interface with selected natural user input (NUI) componentry. Such componentry may be integrated or peripheral to the binocular head mounted display and/or computing system, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display, comprising:
a waveguide;
a convex spherical mount having a fixed position relative to the waveguide; and
a light engine including a concave spherical mount that adjustably mates with the convex spherical mount, wherein an entrance grating of the waveguide is located at a center of curvature of the convex spherical mount and a center of curvature of the concave spherical mount when the convex spherical mount is mated to the concave spherical mount.

2. The display of claim 1, wherein the waveguide is a left eye waveguide or a right eye waveguide.

3. The display of claim 1, wherein the concave spherical mount adjustably mates with the convex spherical mount to change a horizontal entrance angle of light projected into the waveguide from the light engine.

4. The display of claim 1, wherein the concave spherical mount adjustably mates with the convex spherical mount to change a vertical entrance angle of light projected into the waveguide from the light engine.

5. The display of claim 1, wherein the concave spherical mount adjustably mates with the convex spherical mount to change a rotation angle of light projected into the waveguide.

6. The display of claim 1, wherein an exit pupil of the light engine is located at a center of curvature of the convex spherical mount and a center of curvature of the concave spherical mount when the convex spherical mount is mated to the concave spherical mount.

7. The display of claim 6, wherein the exit pupil is a projected exit pupil.

8. The display of claim 7, wherein the light engine projects collimated light via the projected exit pupil.

9. The display of claim 1, wherein light from the light engine is output from the waveguide as a viewable image.

10. The display of claim 1, wherein the convex spherical mount defines a window through which light from the light engine travels into the waveguide.

11. The display of claim 1, wherein the convex spherical mount is positioned on a side of the waveguide.

12. The display of claim 1, wherein the convex spherical mount is positioned on a face of the waveguide.

13. A binocular head mounted display, comprising:
a first waveguide for a first eye including an entrance grating;
a second waveguide for a second eye;
a convex spherical mount having a fixed position relative to the first waveguide; and
a light engine including a concave spherical mount that adjustably mates with the convex spherical mount to selectively change a horizontal entrance angle, a vertical entrance angle, and a rotation angle of collimated light from the light engine into the first waveguide, the light engine having a projected exit pupil located at a center of curvature of the convex spherical mount and a center of curvature of the concave spherical mount when the convex spherical mount is mated to the concave spherical mount;
the entrance grating of the first waveguide located at the center of curvature of the convex spherical mount and the center of curvature of the concave spherical mount when the convex spherical mount is mated to the concave spherical mount.

* * * * *